(12) United States Patent
Lee et al.

(10) Patent No.: US 8,927,154 B2
(45) Date of Patent: Jan. 6, 2015

(54) LITHIUM TITANIUM OXIDE, METHOD OF PREPARING LITHIUM TITANIUM OXIDE, AND LITHIUM RECHARGEABLE BATTERY INCLUDING LITHIUM TITANIUM OXIDE

(75) Inventors: Jong-Hee Lee, Yongin-si (KR); Young-Su Kim, Yongin-si (KR); Jae-Myung Kim, Yongin-si (KR); Kyu-Nam Joo, Yongin-si (KR); So-Ra Lee, Yongin-si (KR); Deok-Hyun Kim, Yongin-si (KR); Gu-Hyun Chung, Yongin-si (KR); Beom-Kwon Kim, Yongin-si (KR); Yong-Mi Yu, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 741 days.

(21) Appl. No.: 12/898,454

(22) Filed: Oct. 5, 2010

(65) Prior Publication Data

US 2011/0086275 A1    Apr. 14, 2011

(30) Foreign Application Priority Data

Oct. 12, 2009   (KR) .................. 10-2009-0096819

(51) Int. Cl.
| | |
|---|---|
| H01M 4/48 | (2010.01) |
| H01M 4/13 | (2010.01) |
| H01M 4/485 | (2010.01) |
| H01M 4/131 | (2010.01) |
| C01G 23/00 | (2006.01) |
| H01M 10/052 | (2010.01) |
| H01M 4/02 | (2006.01) |

(52) U.S. Cl.
CPC ........... *C01G 23/005* (2013.01); *C01P 2006/40* (2013.01); *H01M 4/485* (2013.01); *H01M 2004/021* (2013.01); *H01M 4/131* (2013.01); *H01M 4/02* (2013.01); *H01M 10/052* (2013.01); *Y02E 60/122* (2013.01); *C01P 2004/03* (2013.01); *C01P 2002/50* (2013.01)
USPC ....................................... 429/231.5; 423/598

(58) Field of Classification Search
USPC ............................... 429/231.1, 231.5; 423/84
See application file for complete search history.

(56) References Cited

U.S. PATENT DOCUMENTS

| | | |
|---|---|---|
| 6,749,648 B1 | 6/2004 | Kumar et al. |
| 2001/0031401 A1 | 10/2001 | Yamawaki et al. |

(Continued)

FOREIGN PATENT DOCUMENTS

| | | |
|---|---|---|
| JP | 2000-302547 | 10/2000 |
| KR | 10-2001-0066813 | 7/2001 |

(Continued)

OTHER PUBLICATIONS

Korean Office Action issued on Mar. 28, 2013 by KIPO in connection with Korean Patent Application No. 10-2012-0078396 which is the divisional application of Korean Patent Application No. 10-2009-0096819 and Request for Entry attached herewith.

(Continued)

*Primary Examiner* — Kenneth Douyette
*Assistant Examiner* — James Lee
(74) *Attorney, Agent, or Firm* — Robert E. Bushnell, Esq.

(57) ABSTRACT

A spherical primary particle of a lithium titanium oxide of which average diameter is in the range of about 1 to about 20 μm, a method of preparing the spherical primary particle of the lithium titanium oxide, and a lithium rechargeable battery including the spherical primary particle of the lithium titanium oxide.

16 Claims, 4 Drawing Sheets

(56) References Cited

U.S. PATENT DOCUMENTS

| | | | |
|---|---|---|---|
| 2005/0069777 A1* | 3/2005 | Takami et al. | 429/245 |
| 2006/0134521 A1* | 6/2006 | Shima | 429/231.1 |
| 2007/0009798 A1* | 1/2007 | Inagaki et al. | 429/231.1 |
| 2008/0274406 A1* | 11/2008 | Fuse et al. | 429/231.4 |
| 2009/0155692 A1 | 6/2009 | Park et al. | |
| 2010/0183689 A1* | 7/2010 | Lim | 424/401 |

FOREIGN PATENT DOCUMENTS

| | | |
|---|---|---|
| KR | 1020030014271 | 2/2003 |
| KR | 10-2004-0089545 | 10/2004 |
| KR | 10-2008-0023831 | 3/2008 |
| KR | 10-2009-0028207 | 3/2009 |
| KR | 1020090066019 A | 6/2009 |

OTHER PUBLICATIONS

Jian Gao et al. Preparation and characterization of high-density spherical Li4Ti5O12 anode material for lithium secondary batteries, Journal of Power Sources, Jun. 2, 2005, 155 (2006) 364-367. Cited in attached Korean Office action issued on Mar. 28, 2013 by KIPO in connection with Korean Patent Application No. 10-2012-0078396 which is the divisional application of Korean Patent Application No. 10-2009-0096819.

Korean Office Action issued by KIPO on Oct. 5, 2011 in connection with Korean Patent Application No. 10-2009-0096819 and Request for Entry of the Accompanying Office Action attached herewith.

Kiyoshi Kanamura, Takesh Chiba, Kaoru Dokko, "Preparation of Li4Ti5O12 spherical particles for rechargeable lithium batteries", pp. 577-581, vol. 26, Journal of the European Ceramic Society. Cited in Korean Office Action issued by KIPO on Oct. 5, 2011 in connection with Korean Patent Application No. 10-2009-0096819.

Korean Notice of Allowance issued by Korean Patent Office on Nov. 26, 2013 in connection with Korean Patent Application No. 10-2012-0078396 which is divisional application of Korean Patent Application No. 10-2009-0096819 and Request for Entry of the Accompanying Office Action attached herewith.

* cited by examiner

LITHIUM TITANIUM OXIDE, METHOD OF PREPARING LITHIUM TITANIUM OXIDE, AND LITHIUM RECHARGEABLE BATTERY INCLUDING LITHIUM TITANIUM OXIDE

CLAIM OF PRIORITY

This application claims the benefit of Korean Patent Application No. 10-2009-0096819, filed on Oct. 12, 2009, in the Korean Intellectual Property Office, the disclosure of which is incorporated herein in its entirety by reference.

BACKGROUND OF THE INVENTION

1. Field of the Invention

One or more embodiments of the present invention relate to a lithium titanium oxide, a method of preparing the lithium titanium oxide, and a lithium rechargeable battery including the lithium titanium oxide.

2. Description of the Related Art

A lithium ion battery is a kind of a rechargeable battery that generates electricity by motion of lithium ions between a cathode and an anode. The lithium ion rechargeable battery generally includes a cathode, an anode, an electrolyte, and a separator. Cathode and anode active materials as components of the lithium ion battery constitute a structure in which lithium ions move by reversible reactions from the anode active material to the cathode active material during discharging and vice versa during charging.

A lithium metal has been used as an anode active material. However, when a lithium metal is used in a battery, short circuits may occur in the battery due to the formation of dendrite, and thus the battery may explode. Thus, a carbon-based material instead of a lithium metal has been widely used as an anode active material.

Examples of the carbon-based active material may include crystalline carbon such as graphite and artificial graphite, and amorphous carbon such as soft carbon and hard carbon. However, although the amorphous carbon has a large capacity, the amorphous carbon has high irreversibility during charging and discharging. Graphite is representatively used as crystalline carbon. In addition, graphite has a high theoretical restrictive capacity of 372 mA h/g, and thus graphite is used as an anode active material. However, although graphite or a carbon-based active material have a relatively high theoretical capacity, the theoretical capacity is no more than about 380 mAh/g, and thus they may not be used to develop a high-capacity lithium battery.

SUMMARY OF THE INVENTION

One or more embodiments of the present invention include a spherical primary particle of a lithium titanium oxide having a spherical shape.

One or more embodiments of the present invention include a method of preparing the spherical primary particle of the lithium titanium oxide.

One or more embodiments of the present invention include a lithium rechargeable battery including the spherical primary particle of the lithium titanium oxide.

Additional aspects will be set forth in part in the description which follows and, in part, will be apparent from the description, or may be learned by practice of the presented embodiments.

According to one or more embodiments of the present invention, a spherical primary particle of a lithium titanium oxide is provided, wherein an average diameter of the spherical primary particle is about 1 to about 20 μm.

An average diameter of the spherical primary particle may be about 2.5 μm to about 4.5 μm.

A spherical degree of the spherical primary particle may be in the range of about 0.90 to about 0.95, and the spherical degree may be given by Equation 1:

Spherical Degree=short-axis length of the particle/long-axis length of the particle.   Equation 1

The spherical primary particle of the lithium titanium oxide may include a spinel structure.

The spherical primary particle of the lithium titanium oxide may include lithium titanate ($Li_4Ti_5O_{12}$).

The specific spherical primary particle may have a specific surface area of about 2.8 $m^2/g$ to about 6.0 $m^2/g$, and a tap density of about 0.8 g/cc to 2.0 g/cc.

The specific spherical primary particle may have an average diameter of about 2.5 μm to about 4.5 μm, a specific surface area of about 4.8 $m^2/g$ to about 5.7 $m^2/g$, and a tap density of about 1.1 g/cc to about 1.8 g/cc.

The spherical primary particle of the lithium titanium oxide may be used for an anode active material for a lithium rechargeable battery.

According to one or more embodiments of the present invention, a lithium rechargeable battery includes the spherical primary particle of the lithium titanium oxide.

According to one or more embodiments of the present invention, a method of preparing a spherical primary particle of a lithium oxide includes mixing a lithium salt and titania to prepare a mixture; performing heat-treatment on the mixture at a temperature of about 700 to about 900° C.; and atomizing a resultant on which the heat-treatment is performed.

The lithium salt may be at least one selected from the group consisting of lithium nitrate, lithium hydroxide, lithium chloride, lithium oxide and lithium carbonate.

The titania may be rutaile-phase titania.

The tiania may have a spherical shape having a diameter of about 200 nm to about 800 nm.

The tiania may have a monodisperse shape.

A mean diameter (D50) of the titania may be about 0.45 μm to about 0.55 μm, and a mean diameter (D90) of the titania is about 0.76 μm to about 0.80 μm.

A spherical degree of the spherical primary particle may be in the range of about 0.90 to about 0.99, and the spherical degree may be given by Equation 1:

Spherical Degree=short-axis length of particle/long-axis length of particle.   Equation 1

The heat-treatment may be performed at a temperature of about 800 to about 900° C.

The heat-treatment may be performed for about 0.5 to about 4 hours.

The spherical primary particle of the lithium titanium oxide may be used for an anode active material for a lithium rechargeable battery.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE INVENTION

Reference will now be made in detail to embodiments.

In order to develop a lithium ion rechargeable battery having good performances such as rapid charging/discharging and long lifetime, active research has been recently conducted on using lithium titanate ($Li_4Ti_5O_{12}$), which is a metal oxide having a spinel structure, as an anode active material.

$Li_4Ti_5O_{12}$ does not generate a solid state interphase (SEI) that is generated in an accompanying reaction between a graphite-based anode active material and an electrolyte. Thus, $Li_4Ti_5O_{12}$ is much better than graphite in terms of the irreversible capacity, and has excellent reversibility for lithium ions to be inserted into and released from $Li_4Ti_5O_{12}$ in a repetitive charging/discharging cycle. In addition, $Li_4Ti_5O_{12}$ is very stable in terms of its structure, and thus $Li_4Ti_5O_{12}$ may lead to improved performances of a rechargeable battery, such as long lifetime.

A method of preparing $Li_4Ti_5O_{12}$ may be largely classified into a liquid phase method and a solid phase method.

The liquid phase method is used to prepare a precursor having a new shape, and may be used to obtain powders having a fine particle size and a high chemical uniformity by reducing a distance between ions so as to lower a reaction temperature and to reduce a reaction time. However, materials used in the liquid phase method are expensive. In addition, negative ion impurities are also precipitated to be mixed with particles by lattice bonding and to be absorbed into surfaces of the powders, which is a serious problem.

On the other hand, the solid phase method is very simple. The costs of the solid phase method are much lower and reproducibility is higher, compared to the liquid phase method. However, impurities may be mixed during pulverization, and it is difficult to change a shape of a powder into a spherical shape by using a general method.

A shape of an active material used to form a battery is very important. An active material having a spherical shape is advantageous for easily preparing an electrode and for increasing a packing intensity, and thus the active material may increase the amount of a battery including the active material. Accordingly, a technology of preparing an active material in a spherical shape is necessary to obtain a lithium ion rechargeable battery that is highly stable and is rapidly charged and discharged.

According to an embodiment of the present invention, a spherical primary particle of a lithium titanium oxide has an average diameter of about 1 to about 20 μm. For example, an average diameter of the spherical primary particle may be about 2.5 μm to about 4.5 μm.

According to an embodiment of the present invention, a spherical particle of lithium titanium oxide may have a spherical degree in the range of about 0.90 to about 0.95.

The spherical degree is given by Equation 1:

Spherical Degree=short-axis length of the particle/long-axis length of the particle.   Equation 1

According to Equation 1, a perfect sphere has a spherical degree of 1. In addition, as the spherical degree of a particle is closer to 1, the particle has a shape closer to a perfect sphere.

According to an embodiment of the present invention, a spherical primary particle of a lithium titanium oxide may have a spinel structure, and the spherical primary particle of the lithium titanium oxide may include $Li_4Ti_5O_{12}$.

According to an embodiment of the present invention, the specific spherical primary particle may have an average diameter of about 1 μm to about 20 μm, a specific surface area of about 2.8 $m^2$/g to about 6.0 $m^2$/g, and a tap density of about 0.8 g/cc to 2.0 g/cc.

According to an embodiment of the present invention, the specific spherical primary particle may have an average diameter of about 2.5 μm to about 4.5 μm, a specific surface area of about 4.8 $m^2$/g to about 5.7 $m^2$/g, and a tap density of about 1.1 g/cc to about 1.8 g/cc.

According to an embodiment of the present invention, the spherical primary particle of the lithium titanium oxide may be used for a cathode or anode active material for a lithium rechargeable battery, for example, may be used for an anode active material for a lithium rechargeable battery.

Since the spherical primary particle of the lithium titanium oxide may be formed of titania having a monodisperse shape, which will be described later, the spherical primary particle of the lithium titanium oxide has the specific surface and the tap density having the above-described ranges.

Next, a method of preparing a spherical primary particle of a lithium titanium oxide will be described.

According to an embodiment of the present invention, a method of preparing a spherical primary particle of lithium titanium oxide includes mixing a lithium salt and titania; performing heat-treatment on the mixture at a temperature of about 700 to about 900° C.; and atomizing the resultant on which the heat-treatment is performed.

The atomizing may be pulverization, disintegration, or the like. For example, the atomizing may be disintegration.

According to an embodiment of the present invention, the lithium salt may be at least one selected from the group consisting of lithium nitrate, lithium hydroxide, lithium chloride, lithium oxide and lithium carbonate.

According to an embodiment of the present invention, titania may have a spherical shape, and may be a monodisperse spherical fine-particle having an average diameter of several nonometers and a small diameter dispersity, which is used as a precursor of $Li_4Ti_5O_{12}$. The average diameter of the titania may be in the range of about 10 to about 1,000 nm. However, when the titania has a diameter of several tens of nanometers, titania particles may be aggregated to each other during the heat-treatment. Thus, titania having an average diameter of about 200 nm to about 800 nm may be used. The titania may be anatase-phase titania. However, in order to maintain a spherical shape of the titania and to resolve the problem of aggregation between particles, the titania may be rutile-phase titania that is stable at a high temperature.

According to an embodiment of the present invention, the titania may have a monodisperse shape, and may have a spherical degree in the range of about 0.90 to about 0.99.

A spherical degree is given by Equation 1.

Spherical Degree=short-axis length of particle/long-axis length of particle.   Equation 1

A degree of monodispersion of titania may be determined based on a mean diameter (D50) and a mean diameter (D90). A D50 of the titania may be about 0.45 μm to about 0.55 μm, and a D90 of the titania may be about 0.76 μm to about 0.80 μm.

The terminologies 'D50' and 'D90' are well known to one of ordinary skill in the art. In short, the D50 denotes an intermediate diameter of a particle, and the D90 denotes a maximum diameter of a particle. The detailed description will be easily understood with reference to recited references.

As described above, when the titania having the monodisperse shape with the above-mentioned ranges is used, the spherical primary particle of the lithium titanium oxide has the average diameter with the above-mentioned ranges.

In the mixing of the lithium salt and the titania, material powders are put in Li:Ti=4:5, a ball milling operation is performed on the lithium and the titania, and then the lithium salt and the titania are regularly mixed.

During the heat-treatment, the heat-treatment may be performed for about 0.5 to about 4 hours at a temperature of about 800 to about 900° C.

When rutile-phase titania is used, if the heat-treatment is performed at a temperature higher than 900° C., another material instead of $Li_4Ti_5O_{12}$ may be generated.

During the heat-treatment, lithium is made to a solid solution at a temperature equal to or greater than a melting point, and $Li_4Ti_5O_{12}$ having a spinel structure is crystallized. A period to make lithium change into a solid solution, which is one of conditions of the heat-treatment, may be determined according to a lithium salt, and may be in the range of about 0.5 to about 1.5 hours at a temperature around a melting point of a lithium salt. When the period to make lithium change into a solid solution is longer than 1.5 hours, particles are largely grown to form a coarse particle, and an aggregation state between particles is getting more serious in proportion to a period of time. A crystallization temperature may be in the range of about 700 to about 900° C., for example, about 800 to about 900° C. Within these ranges, the crystalline degree and yield of $Li_4Ti_5O_{12}$ may be optimized.

In a last operation, the preparation of $Li_4Ti_5O_{12}$ powders is completed by disintegrating $Li_4Ti_5O_{12}$ powders so as to change them into fine particles.

According to an embodiment of the present invention, the spherical primary particle of the lithium titanium oxide may be used for a cathode or anode active material for a lithium rechargeable battery, for example, may be used for an anode active material for a lithium rechargeable battery.

The spherical degree of a prepared $Li_4Ti_5O_{12}$ particle may be compared with the spherical degree calculated by Equation 1.

The spherical degree of the prepared $Li_4Ti_5O_{12}$ particle prepared by the method in which titania having a monodisperse spherical shape is used as a precursor may be adjusted in the range of about 0.90 to about 0.95.

Hereinafter, one or more embodiments of the present invention will be described in detail with reference to the following examples. However, these examples are not intended to limit the purpose and scope of the one or more embodiments of the present invention.

EXAMPLE 1

Mixed powders were prepared by measuring 16.1 wt % of lithium carbonate and 43.5 wt % of rutile-phase titania of which particle had a spherical degree of 0.94 (D50=0.49 μm and D90=0.78 μm), putting the mixture in a container formed of zirconia and filled with zirconia balls, performing a milling operation at a rotation speed of 450 rpm for 6 hours, and then disintegrating and mixing raw materials.

A final resultant was obtained by sintering the mixed powders in an oxygen atmosphere and a temperature environment where a temperature increased by 5° C. every minutes, at a temperature of 685° C. for 1.5 hours, and at a temperature of 800° C. for 5 hours, and then disintegrating the sintered material in a disintegrator.

Figure 2:
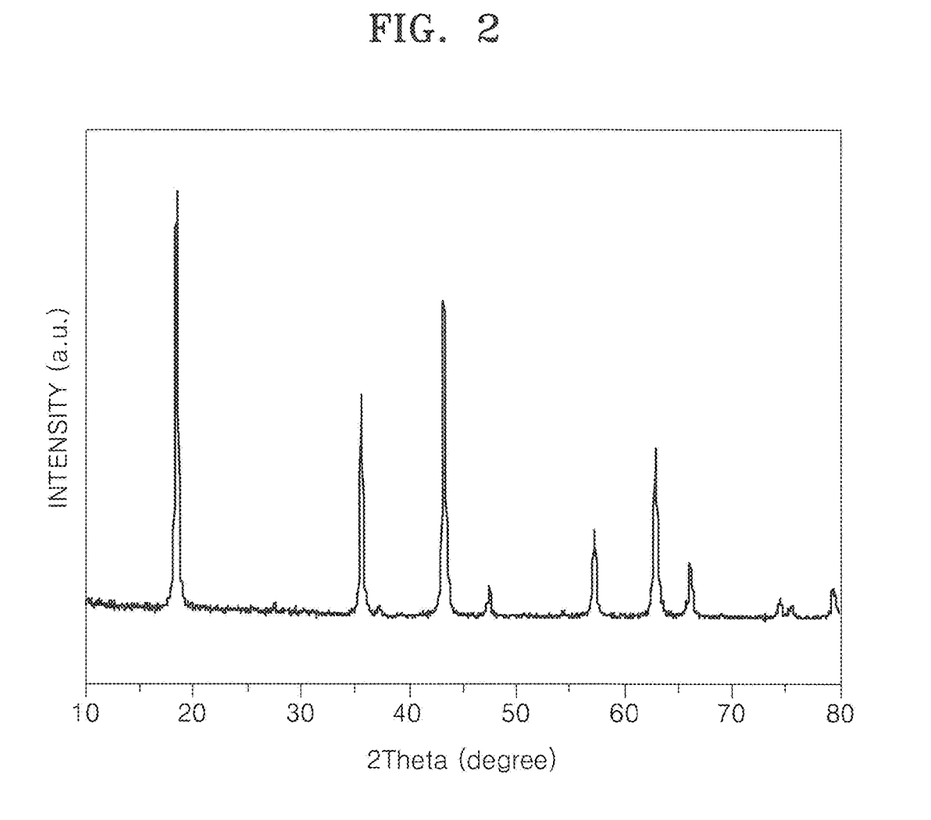
FIG. 2 is a graph showing X-ray diffraction (XRD) of a lithium titanium oxide according to an embodiment of the present invention.
Figure 4:
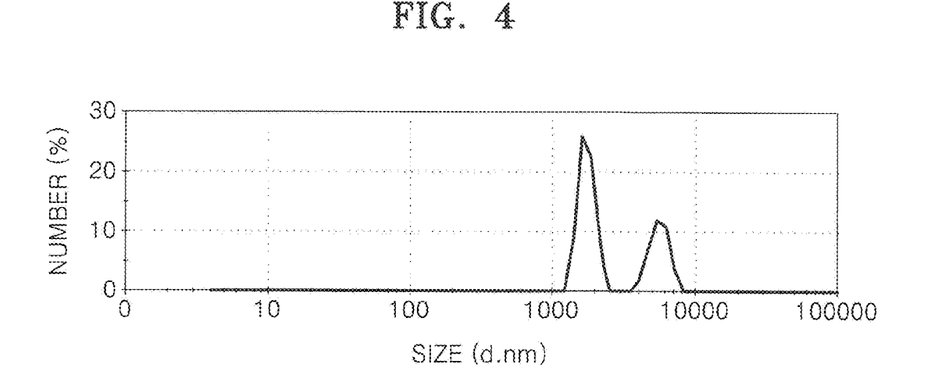
FIG. 4 is a graph showing an analysis result of a particle size distribution of a lithium titanium oxide according to an embodiment of the present invention.

FIG. 2 is a graph showing X-ray diffraction (XRD) of a lithium titanium oxide according to an embodiment of the present invention. Referring to FIG. 2, according to analysis of X-ray crystalline structure, $Li_4Ti_5O_{12}$ having a spinel structure was successfully synthesized FIG. 4 is a graph showing an analysis result of a particle size distribution of a lithium titanium oxide according to an embodiment of the present invention. Referring to FIG. 4, it may be seen that the lithium titanium oxide exhibits a monodisperse distribution.

Figure 3A:
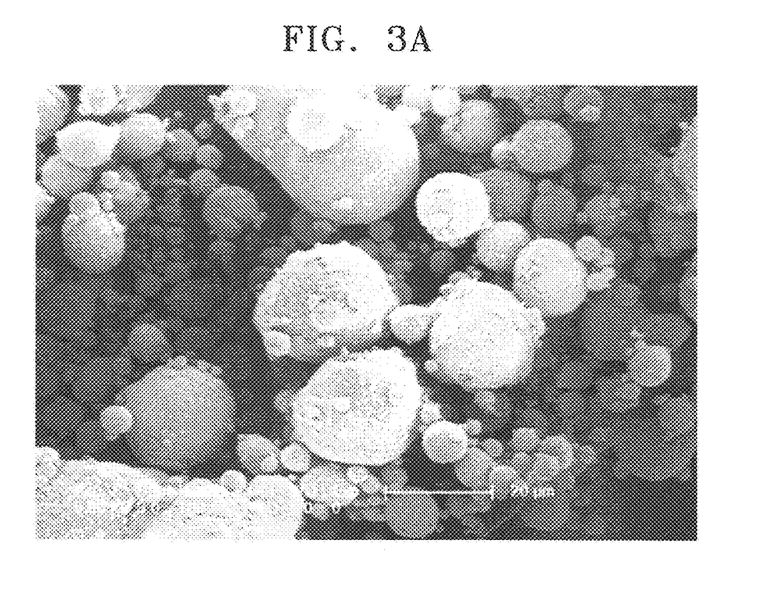
FIGS. 3A and 3B are scanning electron microscope (SEM) images of a lithium titanium oxide according to an embodiment of the present invention.
Figure 3B:
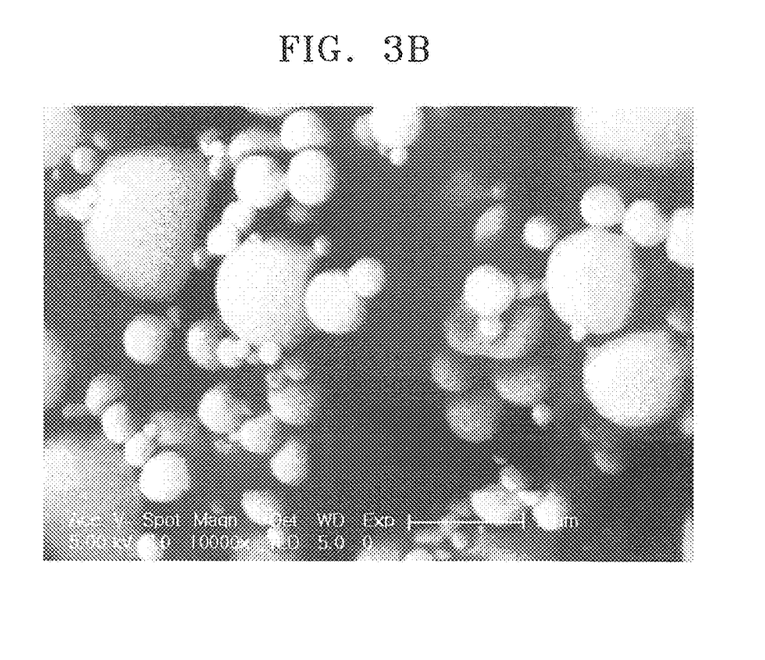

An average spherical degree ($\Psi$) of the prepared $Li_4Ti_5O_{12}$ particle was equal to or greater than 0.92, and an average diameter of the prepared $Li_4Ti_5O_{12}$ particle was 4.5 μm. In addition, a specific surface area of the prepared $Li_4Ti_5O_{12}$ particle was about 4.8, and a tap density of the prepared $Li_4Ti_5O_{12}$ particle was 1.1. FIGS. 3A and 3B are scanning electron microscope (SEM) images of a lithium titanium oxide according to an embodiment of the present invention.

EXAMPLE 2

Mixed powders were prepared by measuring 16.1 wt % of lithium carbonate and 43.5 wt % of anatase-phase titania of which particle had a spherical degree of 0.93 (D50=0.51 μm and D90=0.80 μm), putting the mixture in a container formed of zirconia and filled with zirconia balls, performing a milling operation at a rotation speed of 450 rpm for 6 hours, and then disintegrating and mixing raw materials.

$Li_4Ti_5O_{12}$ powders having a spinel structure was prepared by performing heat-treatment on the mixed powders in an oxygen atmosphere and a temperature environment where a temperature increased by 5° C. every minutes, at a temperature of 685° C. for 1.5 hours, and a temperature of 800° C. for 5 hours, and then disintegrating the sintered material in a disintegrator.

An average spherical degree ($\Psi$) of the prepared $Li_4Ti_5O_{12}$ particle was equal to or greater than 0.91, and an average diameter of the prepared $Li_4Ti_5O_{12}$ particle was 3.4 μm. In addition, a specific surface area of the prepared $Li_4Ti_5O_{12}$ particle was about 5.3, and a tap density of the prepared $Li_4Ti_5O_{12}$ particle was 1.5.

EXAMPLE 3

Mixed powders were prepared by measuring 18.3 wt % of lithium hydroxide and 43.5 wt % of rutile-phase titania of which particle had a spherical degree of 0.94 (D50=0.45 μm and D90=0.78 μm), putting the mixture in a container formed of zirconia and filled with zirconia balls, performing a milling operation at a rotation speed of 450 rpm for 6 hours, and then disintegrating and mixing raw materials.

$Li_4Ti_5O_{12}$ powders having a spinel structure was prepared by sintering the mixed powders in an oxygen atmosphere and a temperature environment where a temperature increased by 5° C. every minutes, at a temperature of 450° C. for 1.5 hours, at a temperature of 800° C. for 5 hours, and then disintegrating the sintered material in a disintegrator.

An average spherical degree ($\Psi$) of the prepared $Li_4Ti_5O_{12}$ particle was equal to or greater than 0.92, and an average diameter of the prepared $Li_4Ti_5O_{12}$ particle was 2.5 μm. In addition, a specific surface area of the prepared $Li_4Ti_5O_{12}$ particle was about 5.7, and a tap to density of the prepared $Li_4Ti_5O_{12}$ particle was 1.8.

COMPARATIVE EXAMPLE 1

Mixed powders were prepared by measuring 16.1 wt % of lithium carbonate and 43.5 wt % of amorphous rutile-phase titania, putting the mixture in a container formed of zirconia and filled with zirconia balls, performing a milling operation at a rotation speed of 450 rpm for 6 hours, and then disintegrating and mixing raw materials.

A final resultant was obtained by sintering the mixed powders in an oxygen atmosphere and a temperature environment where a temperature increased by 5° C. every minute, at a temperature of 685° C. for 1.5 hours, and at a temperature of 800° C. for 5 hours, and then disintegrating the sintered material in a disintegrator.

An average spherical degree ($\Psi$) of the prepared $Li_4Ti_5O_{12}$ particle was equal to or greater than 0.44, and an average diameter of the prepared $Li_4Ti_5O_{12}$ particle was 1.7 µm. In addition, a specific surface area of the prepared $Li_4Ti_5O_{12}$ particle was about 6.2, and a tap density of the prepared $Li_4Ti_5O_{12}$ particle was 0.8.

Comparison of Spherical Degree of $Li_4Ti_5O_{12}$

The spherical degrees measured in Examples 1, 2 and 3 and Comparative Example 1 are shown in Table 1.

TABLE 1

| | Average spherical degree ($\Psi$) |
|---|---|
| Comparative Example 1 | 0.44 |
| Example 1 | 0.92 |
| Example 2 | 0.91 |
| Example 3 | 0.92 |

As shown in Table 1, it may be seen that the spherical degree of the $Li_4Ti_5O_{12}$ particle prepared in Comparative Example 1 is much smaller than that of the $Li_4Ti_5O_{12}$ particle prepared in Examples 1, 2 and 3.

Figure 1:
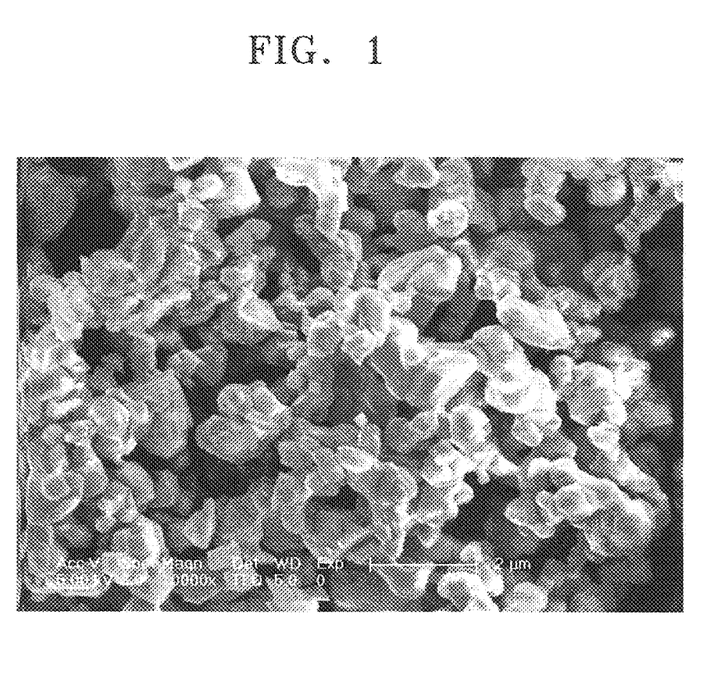
FIG. 1 is a scanning electron microscope (SEM) image of a lithium titanium oxide prepared in Comparative Example 1.

FIGS. 1, 3A and 3B are SEM images of $Li_4Ti_5O_{12}$ particles prepared in Comparative Example 1 and Example 1, respectively.

Referring to FIGS. 1, 3A and 3B, the $Li_4Ti_5O_{12}$ particle of Example 1 has a almost perfect sphere, but the $Li_4Ti_5O_{12}$ particle of Comparative Example 2 has a non-sphere shape, which corresponds to the comparison of spherical degree with reference to Table 1.

Preparation of Electrode

EXAMPLE 4

An electrode was prepared by mixing 0.045 g of a material prepared in Example 1 and 0.045 g of graphite (SFG6, available from TimCal) in 0.2 g of a solution of polyvinylidene fluoride (PVDF) (KF1100, available from Gureha Chemistry of Japan) as a binder and 5 wt % of N-methylpyrrolidone (NMP), and then coating the mixture on a copper foil.

COMPARATIVE EXAMPLE 2

An electrode was prepared in the same manner as in Example 4 except that 0.045 g of a material prepared in Comparative Example 1 and 0.045 g of graphite (SFG6, available from TimCal) were mixed.

EXPERIMENTAL EXAMPLE 1

Cycle Properties Test

A coin cell of 2016—form was prepared by using the electrodes prepared in Example 4 and Comparative Example 2 as an anode, and a LI metal as a cathode, and the coin cell was charged and discharged at a voltage between about 1.5 and about 0 V.

A mixed solution of ethylene carbonate (EC), diethylene carbonate (DEC) and fluoro ethylene carbonate (volume ratio: 2/6/2), in which 1.3 M of $LiPF_6$ was dissolved, was used as an electrolyte. Charging was performed on a Li electrode up to 0.001 V by supplying a static current of 100 mA per 1 g of an active material, and then static-voltage charging was performed while a voltage of 0.001 V was maintained until a measured current reached 10 mA per 1 g of the active material. After a pause period of the coin cell on which charging was completed for about 10 minutes, static-current discharging was performed up to a voltage of 1.5 V by supplying a static current of 100 mA per 1 g of the active material. The result is shown in Table 2.

TABLE 2

| | Initial Discharging Capacity (mAh/g) | Initial Efficiency (%) | Capacity Maintenance (%) @ 50 cycles |
|---|---|---|---|
| Example 4 | 167 | 99.6 | 99.3 |
| Comparative Example 2 | 164 | 98.7 | 97.8 |

As shown in Table 2, it may bee seen that the initial capacity and initial efficiency of Example 4 are larger than in Comparative Example 2.

As described above, according to the one or more of the above embodiments of the present invention, by a method of preparing a spherical primary particle of a lithium titanium oxide, a spherical primary particle of a lithium titanium oxide having a higher spherical degree may be prepared at a lower preparing cost, compared to a general method.

According to the one or more of the above embodiments of the present invention, a spherical primary particle of a lithium titanium oxide may be adjusted in a spherical shape, thereby increasing the tab density and packing density of an active material.

According to the one or more of the above embodiments of the present invention, a spherical primary particle of a lithium titanium oxide may have a spherical shape, and thus a packing operation is easily performed, and the amount of a lithium rechargeable battery including the lithium titanium oxide may increase.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A spherical primary particle of a lithium titanium oxide, wherein an average diameter of the spherical primary particle is about 2.5 µm to about 4.5 µm, a spherical degree of the spherical primary particle is in the range of about 0.90 to about 0.95, wherein the spherical degree is given by Equation 1:

$$\text{Spherical Degree} = \text{short-axis length of the particle}/\text{long-axis length of the particle}, \quad \text{Equation 1}$$

wherein the lithium titanium oxide has a monodisperse particle size distribution.

2. The spherical primary particle of the lithium titanium oxide of claim 1, wherein the spherical primary particle of the lithium titanium oxide comprises a spinel structure.

3. The spherical primary particle of the lithium titanium oxide of claim 1, wherein the spherical primary particle of the lithium titanium oxide comprises lithium titanate ($Li_4Ti_5O_{12}$).

4. The spherical primary particle of the lithium titanium oxide of claim 1, wherein the specific primary particle has a specific surface area of about 2.8 $m^2$/g to about 6.0 $m^2$/g, and a tap density of about 0.8 g/cc to 2.0 g/cc.

5. The spherical primary particle of the lithium titanium oxide of claim 1, wherein the specific primary particle has a specific surface area of about 4.8 $m^2$/g to about 5.7 $m^2$/g, and a tap density of about 1.1 g/cc to about 1.8 g/cc.

6. The spherical primary particle of the lithium titanium oxide of claim 1, wherein the spherical primary particle of the lithium titanium oxide is used for an anode active material for a lithium rechargeable battery.

7. A lithium rechargeable battery comprising the spherical primary particle of the lithium titanium oxide of any one of claims 1 through 6.

8. A method of preparing a spherical primary particle of a lithium oxide of claim 1, the method comprising:
   mixing a lithium salt and titania to prepare a mixture;
   performing heat-treatment on the mixture at a temperature of about 700 to about 900° C.; and
   atomizing a resultant on which the heat-treatment is performed.

9. The method of claim 8, wherein the lithium salt is at least one selected from the group consisting of lithium nitrate, lithium hydroxide, lithium chloride, lithium oxide and lithium carbonate.

10. The method of claim 8, wherein the titania is rutaile-phase titania.

11. The method of claim 8, wherein the tiania has a spherical shape having a diameter of about 200 nm to about 800 nm.

12. The method of claim 8, wherein the tiania has a monodisperse shape.

13. The method of claim 12, wherein a mean diameter (D50) of the titania is about 0.45 μm to about 0.55 μm, and
   wherein a mean diameter (D90) of the titania is about 0.76 μm to about 0.80 μm.

14. The method of claim 8, wherein the heat-treatment is performed at a temperature of about 800° C. to about 900° C.

15. The method of claim 8, wherein the heat-treatment is performed for about 0.5 to about 4 hours.

16. The method of claim 8, comprised of fabricating a lithium rechargeable battery having an anode active material formed from the spherical primary particle of the lithium titanium oxide.

* * * * *